(12) United States Patent
Marten

(10) Patent No.: US 7,022,175 B2
(45) Date of Patent: Apr. 4, 2006

(54) INITIAL SOLIDS MIXTURE FOR A LATER ORGANIC COATING APPLICATION

(75) Inventor: Anita Marten, Blaustein (DE)

(73) Assignee: DaimlerChrysler AG, Stuttgart (DE)

( * ) Notice: Subject to any disclaimer, the term of this patent is extended or adjusted under 35 U.S.C. 154(b) by 196 days.

(21) Appl. No.: 09/991,022

(22) Filed: Nov. 21, 2001

(65) Prior Publication Data

US 2002/0088373 A1    Jul. 11, 2002

(30) Foreign Application Priority Data

Nov. 23, 2000  (DE) ................................ 100 58 018

(51) Int. Cl.
*C09C 1/62*     (2006.01)

(52) U.S. Cl. ...................... 106/403; 106/404; 106/482; 106/499; 252/512; 252/518.1; 252/516; 252/521.4; 252/519.33; 252/521.3; 501/96.3; 501/90; 501/88; 501/87; 524/509; 524/594

(58) Field of Classification Search ............... 106/404, 106/419, 436, 435, 438, 456, 403, 499, 482; 423/439; 501/88, 95.1, 95.2, 95.3, 96.3, 501/90, 87; 75/232, 236; 524/509, 594; 252/519.33, 512, 516, 516.1, 521, 518.1, 252/521.3–521.4

See application file for complete search history.

(56) References Cited

U.S. PATENT DOCUMENTS

| | | | | |
|---|---|---|---|---|
| 5,654,246 A | * | 8/1997 | Newkirk et al. | ............... 501/80 |
| 5,723,535 A | * | 3/1998 | Krismer et al. | ............. 524/591 |
| 6,280,496 B1 | * | 8/2001 | Kawai et al. | ................. 75/236 |
| 6,420,293 B1 | * | 7/2002 | Chang et al. | ............... 501/95.2 |
| 6,558,746 B1 | * | 5/2003 | Starz et al. | ................. 427/387 |

FOREIGN PATENT DOCUMENTS

DE          197 48 764          5/1999

* cited by examiner

*Primary Examiner*—J. A. Lorengo
(74) *Attorney, Agent, or Firm*—Kenyon & Kenyon

(57) ABSTRACT

An initial solids mixture for a later organic coating, such as pigmented coatings, films, priming coats, etc., e.g., for a coil coating method in which an initial solids mixture is applied to a substrate, e.g., broad strip, and this is thereby pre-coated, wherein the initial solids mixture includes, as additive particles, boron carbide and/or silicon carbide and/or compounds of transition elements or lanthanides, the electrical conductivity of which is selected to be in the metallic range ($\sigma > 10^2$ 1/$\Omega$cm and $\sigma < 10^7$ 1/$\Omega$cm), during the later coating, the additive particles have a continuous physical connection in at least one spatial direction.

11 Claims, No Drawings

INITIAL SOLIDS MIXTURE FOR A LATER ORGANIC COATING APPLICATION

FIELD OF THE INVENTION

The present invention relates to an initial solids mixture for a later organic coating application.

BACKGROUND INFORMATION

German Published Patent Application No. 197 48 764 describes an initial quantity for producing weldable organic coil coatings. Beside the normal organic components, which later form the matrix of the coating by curing and/or mutual cross-linking, the initial solids mixture has, as additive pigments in quantities between 40 and 70% zinc and/or aluminum and/or graphite and/or molybdenum disulfide and/or soot and/or iron phosphide. The additive pigments are used at least partially for the improvement or implementation, as the case may be, of an electrical conductivity of the initial solid mixture, with which a coil coating method first becomes possible.

In this method, used particularly in the metal working industry, the initial solid mixture is deposited onto a substrate, e.g., broad strip, and cured, whereby the latter becomes pre-coated. On account of this, savings in method steps and cleaning steps are possible, for example, in automobile manufacturing, since the coating can be a corrosion protection primer, by which the pre-treated sheet metal, made, for example, of steel, galvanized and/or other pre-treated steel, or of aluminum is protected from corrosion. The desired pre-coated sheet metal parts are formed, stamped, the parts obtained are joined using diverse methods such as welding, bonding, riveting, crimping, and after that, the joined part, for instance, a vehicle body or parts thereof, are conveyed to an operation for further coating.

However, in the case of an initial solids mixture, the addition of iron phosphide carries with it the danger of phosphane ($PH_3$) development, in the case of hydrolysis and combustion, which does not have an inconsiderable toxicity, and also that iron phosphide has a not inconsiderable cost price. Furthermore, in the case of environmentally friendly water being used as solvent, the risk of hydrolysis always exists.

It is an object of the present invention to provide an initial solids mixture to the extent that in a coil coating method an aqueous based, or at least a water-containing adhesive agent system may be used.

SUMMARY

The above and other beneficial objects of the present invention are achieved by providing an initial solids mixture as described herein. By the at least partial replacement of the additive pigments by the additive particles according to the present invention, the foregoing disadvantages are at least decreased and may be eliminated.

Furthermore, the additive particles are toxicologically less risky and also have a more stable, and thus better, mostly even metallic conductivity properties. In the case of some of the additive particles, the simultaneous presence of a non-noble metal, e.g., zinc, for adjusting the corrosion protecting properties of the coating later produced from the initial solids mixture according to the present invention is of advantage, but in the case of others it is dispensable for achieving the required or at least comparable results with respect to electrical conductivity and also with respect to corrosion-protecting effect. Non-noble metal conductors tend to oxide formation, which goes along with the formation of increased contact resistance. Depending on the degree of oxide formation, this leads to a decrease in conductivity and to undefined variations in conductivity, and thus to diminished process safety during welding. It may be advantageous only to use a composition which fulfills the requirements, without adding a non-noble metallic conductor, whereby process safety is improved automatically.

Furthermore, no toxic gases at all develop during the welding of sheet metal coated with the initial solids mixture according to the present invention, as may occur during the conventional use of phosphides.

In addition to the compounds boron carbide and silicon carbide for the present application range, other possibilities for the additive particles are the transition elements iron, manganese, zirconium, titanium, vanadium, tungsten and molybdenum and, for example, the element cerium as representing the lanthanum series, in various, e.g., low oxidation states, in various compounds which are, e.g., oxides, silicides, carbides and borides.

Many of these compounds exist also as conductive mixed compounds (such as iron titanium oxide) or mixed in various oxidation states (e.g., $Fe_3O_4$). Besides that, mixtures among one another of the compounds named and/or mixtures with zinc powder may be used. Even at relatively low additive amounts, zinc provides cathodic protection with respect to corrosion attack in addition to electrical conductivity, and it is reasonable costwise, but also does have the foregoing disadvantages.

Some of the compounds named even have exceptionally good conductivity in the metallic range ($\sigma > 10^2$ 1/$\Omega$cm and $\sigma < 10^7$ 1/$\Omega$cm), even at particle sizes in the range of less than 1 μm, embedded in a non-conducting polymer matrix, for example, as long as that guarantees percolation of the conducting particles among one another, or the coating having particle sizes in the range of the aimed-at layer thickness is electrically connected through to the carrier at least in one direction.

In general, a relatively high proportion of additive particles may be added if the percolation of the additive particles in the ready state of the coating is to be guaranteed, e.g., the proportion of adhesive agent to additive particles is in a range such as 1:2 or 1:3, these numerical values being influenced by the density and the particle size of the additive particles used, but also strongly by the adhesive agent.

A negative influence comparable to the oxide formation in the case of the less noble metallic conductors, which leads to high contact resistances and hard to control conductance fluctuations, may not be observed in the case of the electrically conducting compounds. However, to achieve a uniform coating, the additive particles may be worked well into the adhesive agent, that is, an attempt is made at a substantially complete covering of the additive particles with coating resin, the adhesive agent in general having a high-resistance character, which inevitably always goes along only with a generally clearly lower conductivity of the coating in comparison to the conductivity of the additive particles themselves. From this results the desire for as high as possible a conductivity of the additive particles used, since this property has a directly favorable effect on the feasibility of highly conductive, and therefore, for example, weldable coatings. Since electrical resistance increases in a conventional manner with increasing layer thickness, just as in the case of coatings, in the final analysis, by using highly conductive additive particles, greater layer thicknesses are possible with a predefined maximum resistance limiting value. The possibility of increasing the layer thickness may then, for example, have a favorable effect on the corrosion protection achievable with the coating, or on the possibility of reductions in other method steps.

Correspondingly, it may have a favorable effect if the adhesive agent used does not act insulating because of high resistance, but has an intrinsic electrical conductivity.

Low particle sizes lead to a greater number of contact points during percolation, and to a higher electrical resistance of the finished coating compared to greater particle sizes. Since particle size may maximally be in the range of the targeted layer thickness, and there might rather be a tendency to adjust to a smaller size, in order to avoid settling of the additive particles in the coating solution, the possible bandwidth of particle size is determined. From this too there comes a great interest in an electrical conductivity of the additive particles used, that is as high as possible.

Furthermore, there tends to be an interest in additive particles having as low a density as possible, and thus a higher volume at equal weight proportions in the coating solution. Percolation then occurs earlier, while settling of additive particles at equal particle size may set in with delay. In addition, fewer additive particles by weight are processed, which has an economic and an ecological effect on material procurement as well as the weight of the finished coating, and this, finally, enters into the weight of the finished body. Also, the weight ratio of adhesive agent to conductivity additive particles, with respect to density and particle size of the additive particles, shifts in favor of the adhesive agent.

A relatively high electrical conductivity of the coating is required for body production, according to conventional resistance welding, which, apart from guaranteeing the aimed-at corrosion protection, is also taken to be the minimum requirement for coil coating. For other applications, e.g. coatings of parts, a lower electrical conductivity may be sufficient or even desirable.

Other important criteria are environmental tolerance, guarantee of chemical stability with regard to the conditions of each application, economic and ecological considerations and others. All of the requirements may be achieved by using the present invention.

The conventional coating solutions for coil coating applications probably work only in adhesive agent systems which can hardly be developed aqueously. Additives such as zinc, aluminum or iron phosphide would otherwise be exposed, depending on the pH, to hydrolysis, oxidation or other chemical attack, which they could scarcely resist. Among the additive particles according to the present invention, there are materials which are also compatible with aqueous or water-containing coating solution, which may be developed neutral, acid or alkaline. Since they are chemically very inert, they are not changed even in the case of corrosion attack, i.e., they hardly influence the course of the corrosion in the sense of supporting it, perhaps acting positively, in the sense of a diffusion barrier. According to that, organic, aqueous-based as well as water-containing systems come into consideration as adhesive agent for the additive particles named. In the sense of an ecological as well as an economic solution, however, the aqueous systems may be given preference. To that extent, the use of the additive particles, for example in combination with the adhesive materials described in German Patent Application No. 100 24 256.1 may be used, but in no way limited to that.

DETAILED DESCRIPTION

Several different initial solids mixtures are described in the following examples.

EXAMPLES

Example 1

15 g novolak (Bakelite Company) dilutable in water/solvent mixture,
1.2 g hexamethylenetetramine
alternatively resol, alternatively resol/novolak mixture, alternatively another adhesive agent
45 g $MoO_2$, alternatively 15 g $MoO_2$ and 30 g zinc powder is made up to 100 g with water/solvent mixture.

Example 2

15 g novolak (Bakelite Company) dilutable in water/solvent mixture,
1.2 g hexamethylenetetramine
alternatively resol, alternatively resol/novolak mixture, alternatively another adhesive agent
45 g $MoSi_2$, alternatively 15 g $MoSi_2$ and 30 g zinc powder is made up to 100 g with water/solvent mixture.

Example 3

15 g novolak (Bakelite Company) dilutable in water/solvent mixture,
1.2 g hexamethylenetetramine,
alternatively resol, alternatively resol/novolak mixture, alternatively another adhesive agent
45 g MoB, alternatively 15 g MoB and 30 g zinc powder is made up to 100 g with water/solvent mixture.

Example 4

15 g novolak (Bakelite Company) dilutable in water/solvent mixture,
1.2 g hexamethylenetetramine
alternatively resol, alternatively resol/novolak mixture, alternatively another adhesive agent
45 g $MoB_2$, alternatively 15 g $MoB_2$ and 30 g zinc powder is made up to 100 g with water/solvent mixture.

Example 5

15 g novolak (Bakelite Company) dilutable in water/solvent mixture,
1.2 g hexamethylenetetramine
alternatively resol, alternatively resol/novolak mixture, alternatively another adhesive agent
45 g $Mo_2C$, alternatively 15 g $MO_2C$ and 30 g zinc powder is made up to 100 g with water/solvent mixture.

Example 6

15 g novolak (Bakelite Company) dilutable in water/solvent mixture,
1.2 g hexamethylenetetramine
alternatively resol, alternatively resol/novolak mixture, alternatively another adhesive agent
45 g $TiSi_2$, alternatively 15 g $TiSi_2$ and 30 g zinc powder is made up to 100 g with water/solvent mixture.

Example 7

15 g novolak (Bakelite Company) dilutable in water/solvent mixture,
1.2 g hexamethylenetetramine
alternatively resol, alternatively resol/novolak mixture, alternatively another adhesive agent
45 g $TiB_2$, alternatively 15 g $TiB_2$ and 30 g zinc powder is made up to 100 g with water/solvent mixture.

Example 8

15 g novolak (Bakelite Company) dilutable in water/solvent mixture,
1.2 g hexamethylenetetramine
alternatively resol, alternatively resol/novolak mixture, alternatively another adhesive agent
45 g $Fe_2B$, alternatively 15 g $Fe_2B$ and 30 g zinc powder is made up to 100 g with water/solvent mixture.

Example 9

15 g novolak (Bakelite Company) dilutable in water/solvent mixture,
1.2 g hexamethylenetetramine
alternatively resol, alternatively resol/novolak mixture, alternatively another adhesive agent
45 g FeB, alternatively 15 g FeB and 30 g zinc powder is made up to 100 g with water/solvent mixture.

Example 10

15 g novolak (Bakelite Company) dilutable in water/solvent mixture,
1.2 g hexamethylenetetramine
alternatively resol, alternatively resol/novolak mixture, alternatively another adhesive agent 5 g $TiO_2$, alternatively 15 g $TiO_2$ and 30 g zinc powder is made up to 100 g with water/solvent mixture.

Each initial solids mixture was applied to test metal sheets in varying layer thicknesses, using a doctor blade device, and was thermally hardened. Following that, the electrical resistance through sheet metal and coating was determined. The measuring of the electrical conductivity was performed using electrodes, the contact surfaces of which have electrode dimensions the same as are used in electrical spot welding.

As a result, it was determined that, using the coatings produced from the initial solids mixtures according to the present invention, the requirements for electrical spot welding were fulfilled.

Depending on conductivity, size and density of the additive particles used, and the kind of adhesive agent, the viscosity of the coating solution and the ratio of additive particles to adhesive agent proportion, various layer thicknesses up to reaching the limiting value may be implemented. The layer thicknesses achievable at a certain required maximum resistance value were in the range of 1 to values above 20 μm. Comparative measurements on conventional coatings often already reached the maximum resistance value at lower layer thicknesses.

The additive particles used are selected to the effect that they suffice for the economic aspects and the needs of each application case, or that they are given optimized properties such as particle size, concentration, chemical stability, electrical conductivity, density and/or others.

It is also possible to adjust the coating solution used (adhesive agent and formulation) to the additive particles put into use, and to adjust or optimize the application case with respect to certain properties, so that they and the finished coating may fulfill the requirements set in each case with respect to their chemical, physical, economic and/or ecological properties.

Furthermore, the viscosity of the coating solution, the density and the size of the additive particles, the chemical and physical properties of adhesive agent and additive particles, the ratio of additive particles to adhesive agent and the targeted layer thickness of the finished coating are adjusted to one another with regard to each application case.

For application in the coil coating field, one strives for as high as possible an intrinsic conductivity, particle size and corrosion stability on the carrier material in each case, at as low as possible a density and concentration of the additive particles. The adhesive agent formulation may be arranged so that the finished, thin as possible, uniform and pore-free coating has maximum adhesion even at extreme deformation and extreme charging with additive particles, at good corrosion resistance and minimum permeability on the various carrier materials in various media and environmental conditions. This applies against a backdrop of a stable technology and sufficient consideration of environmental protection aspects.

The present invention may also be applied to the production of conductive plastic parts.

What is claimed is:

1. An initial solids coating mixture, comprising:
   an aqueous or water containing organic adhesive agent; and
   electrically conductive additive particles including boron carbide and zinc,
   wherein an electrical conductivity of the boron carbide is in the metallic range,
   wherein the additive particles are configured to have a continuous physical connection in at least one spatial direction,
   wherein the proportion of adhesive agent to additive particles is in a range of 1:3, and
   wherein the aqueous or water containing organic adhesive agent includes hexamethylenetetramine.

2. The initial solids coating mixture according to claim 1, wherein the electrical conductivity is in a range of $\sigma>10^2$ 1/Ωcm to $\sigma<10^7$ 1/Ωcm.

3. An initial solids coating mixture, comprising:
   an aqueous or water containing organic adhesive agent;
   electrically conductive additive particles including at least one of boron carbide, silicon carbide, a conductive oxide, silicide, carbide of transitional elements, boride of transitional elements and lanthanides; and
   a non-noble metal in an elemental state;
   wherein an electrical conductivity of the additive particles is in the metallic range,
   wherein the additive particles are configured to have a continuous physical connection in at least one spatial direction, and
   wherein the non-noble metal includes at least one of zinc and aluminum.

4. The initial solids coating mixture according to claim 3, wherein the carbide of transitional elements, boride of transitional elements and lanthanides form one of mixed oxides, silicides, carbides and borides.

5. The initial solids coating mixture according to claim 3, wherein the transitional elements include at least one of iron, manganese, zirconium, titanium, molybdenum, vanadium and tungsten.

6. The initial solids coating mixture according to claim 3, wherein the lanthanide includes cerium.

7. The initial solids coating mixture according to claim 3, wherein the proportion of adhesive agent to additive particles is in a range of 1:3.

8. An initial solids coating mixture, comprising:
an aqueous or water containing organic adhesive agent; and
electrically conductive additive particles including at least one of boron carbide, silicon carbide, a conductive oxide, silicide, carbide of transitional elements, boride of transitional elements and lanthanides,
wherein an electrical conductivity of the additive particles is in the metallic range,
wherein the additive particles are configured to have a continuous physical connection in at least one spatial direction, and
wherein the proportion of adhesive agent to additive particles is in a range of 1:2.

9. The initial solids coating mixture according to claim 8, wherein the carbide of transitional elements, boride of transitional elements and lanthanides show a mixture of various oxidation states.

10. The initial solids coating mixture according to claim 8, further comprising a non-noble metal in an elemental state.

11. An initial solids coating mixture, comprising:
an aqueous or water containing organic adhesive agent; and
electrically conductive additive particles including at least one of boron carbide, silicon carbide, a conductive oxide, silicide, carbide of transitional elements, boride of transitional elements and lanthanides,
wherein an electrical conductivity of the additive particles is in the metallic range,
wherein the additive particles are configured to have a continuous physical connection in at least one spatial direction, and
wherein the aqueous or water containing organic adhesive agent further comprises hexamethylenetetramine.

* * * * *